US011212711B2

United States Patent
Chang et al.

(10) Patent No.: US 11,212,711 B2
(45) Date of Patent: Dec. 28, 2021

(54) UPLINK INTERFERENCE-BASED MONITORING OF DOWNLINK SIGNALS BY UNMANNED AERIAL VEHICLE

(71) Applicant: Kyocera Corporation, Kyoto (JP)

(72) Inventors: Henry Chang, San Diego, CA (US); Amit Kalhan, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/762,419

(22) PCT Filed: Nov. 13, 2018

(86) PCT No.: PCT/US2018/060770
§ 371 (c)(1),
(2) Date: May 7, 2020

(87) PCT Pub. No.: WO2019/099384
PCT Pub. Date: May 23, 2019

(65) Prior Publication Data
US 2021/0185568 A1   Jun. 17, 2021

Related U.S. Application Data

(60) Provisional application No. 62/725,450, filed on Aug. 31, 2018, provisional application No. 62/683,400, (Continued)

(51) Int. Cl.
*H04W 36/00* (2009.01)
*B64C 39/02* (2006.01)
(Continued)

(52) U.S. Cl.
CPC ....... *H04W 36/0022* (2013.01); *B64C 39/024* (2013.01); *H04W 16/24* (2013.01);
(Continued)

(58) Field of Classification Search
CPC . H04W 36/0022; H04W 36/04; H04W 36/20; H04W 16/24; H04W 72/0413;
(Continued)

(56) References Cited

U.S. PATENT DOCUMENTS 7,054,635 B1 * 5/2006 Ritzen ................. H04W 16/08
455/437
9,253,704 B1  2/2016 Sarkar et al.
(Continued)

OTHER PUBLICATIONS

InterDigital; "Detection of UAV interference," R2-1708734; 3GPP TSG-RAN WG2 Meeting #99; Aug. 12, 2017; Berlin, DE.

*Primary Examiner* — Khai M Nguyen

(57) ABSTRACT

An unmanned aerial vehicle (UAV) calculates an estimated uplink interference caused by the UAV at a neighboring cell based on a downlink signal received from the neighboring cell. Based on the estimated uplink interference, the UAV monitors downlink messages transmitted from the neighboring cell. If the uplink interference experienced by the neighboring cell exceeds an interference threshold, the neighboring cell transmits a downlink message, which includes an uplink interference indicator, to the UAV. Upon receipt of the uplink interference indicator, the UAV transmits a measurement report, including the uplink interference indicator, to the serving cell. In some cases, the serving cell transmits a handover command to the UAV based at least partially on the measurement report. The serving cell may also maintain a mobility history for the neighboring cell. The mobility history indicates a history of uplink interference problems and/or UAV handover availability for the neighboring cell.

28 Claims, 4 Drawing Sheets

Related U.S. Application Data filed on Jun. 11, 2018, provisional application No. 62/587,230, filed on Nov. 16, 2017.

(51) Int. Cl.
| | | |
|---|---|---|
| *H04W 16/24* | (2009.01) | |
| *H04W 36/04* | (2009.01) | |
| *H04W 74/00* | (2009.01) | |
| *H04W 36/20* | (2009.01) | |
| *H04W 72/04* | (2009.01) | |
| *H04B 7/185* | (2006.01) | |

(52) U.S. Cl.
CPC ........... *H04W 36/04* (2013.01); *H04W 36/20* (2013.01); *H04W 72/0413* (2013.01); *H04W 74/004* (2013.01); *H04W 74/006* (2013.01); *B64C 2201/122* (2013.01); *H04B 7/18506* (2013.01)

(58) Field of Classification Search
CPC .............. H04W 74/004; H04W 74/006; B64C 39/024; B64C 2201/122; H04B 7/18506
See application file for complete search history.

(56) References Cited

U.S. PATENT DOCUMENTS

| | | | |
|---|---|---|---|
| 2009/0103445 A1* | 4/2009 | Sammour | ............. H04L 1/1887 370/252 |
| 2013/0189991 A1 | 7/2013 | Rose et al. | |
| 2014/0140295 A1* | 5/2014 | Manssour | ............ H04J 11/0053 370/329 |
| 2014/0179321 A1 | 6/2014 | Cucala Garcia | |
| 2017/0295069 A1* | 10/2017 | Sweet, III | ......... C23C 16/45531 |
| 2017/0324469 A1* | 11/2017 | Jalali | ........................ H01Q 1/28 |
| 2018/0375568 A1* | 12/2018 | De Rosa | ............... H04W 72/04 |
| 2020/0374889 A1* | 11/2020 | Kalhan | ........... H04W 36/00837 |

* cited by examiner

UPLINK INTERFERENCE-BASED MONITORING OF DOWNLINK SIGNALS BY UNMANNED AERIAL VEHICLE

CLAIM OF PRIORITY

The present application claims priority to Provisional Application No. 62/587,230, entitled "UL INTERFERENCE INDICATOR BASED UAVS HANDOVER," filed Nov. 16, 2017; Provisional Application No. 62/683,400, entitled "METHOD FOR SENDING UPLINK INTERFERENCE INDICATOR FROM NEIGHBOR CELLS TO UNMANNED AERIAL VEHICLES," filed Jun. 11, 2018; and Provisional Application No. 62/725,450, entitled "UPLINK INTERFERENCE-BASED MONITORING OF DOWNLINK SIGNALS BY UNMANNED AERIAL VEHICLE," filed Aug. 31, 2018, which are assigned to the assignee hereof and hereby expressly incorporated by reference in their entirety.

REFERENCE TO CO-PENDING APPLICATION FOR PATENT

The present application relates to PCT Application, entitled "INTERFACE AVAILABILITY-BASED HANDOVER OF UNMANNED AERIAL VEHICLE,", filed on Nov. 13, 2018, and assigned to the assignee hereof and expressly incorporated by reference herein.

FIELD

This invention generally relates to wireless communications and more particularly to mitigating interference caused by unmanned aerial vehicles.

BACKGROUND

Aerial vehicles (AVs), such as drones, have received increasing interest in the past few years. AVs can be used to perform many different applications, including package delivery, real-time imaging, video surveillance, solar farm inspection, fire and storm assessment, search-and-rescue, monitoring of critical infrastructure, and wildlife conservation. Many of these emerging use cases could benefit from connecting the AV to a cellular network as a user equipment (UE) device.

SUMMARY

An unmanned aerial vehicle (UAV) calculates an estimated uplink interference caused by the UAV at a neighboring cell based on a downlink signal received from the neighboring cell. Based on the estimated uplink interference, the UAV monitors downlink messages transmitted from the neighboring cell. If the uplink interference experienced by the neighboring cell exceeds an interference threshold, the neighboring cell transmits a downlink message, which includes an uplink interference indicator, to the UAV. Upon receipt of the uplink interference indicator, the UAV transmits a measurement report, including the uplink interference indicator, to the serving cell. In some cases, the serving cell transmits a handover command to the UAV based at least partially on the measurement report. The serving cell may also maintain a mobility history for the neighboring cell. The mobility history indicates a history of uplink interference problems and/or UAV handover availability for the neighboring cell.

DETAILED DESCRIPTION

Figure 1:
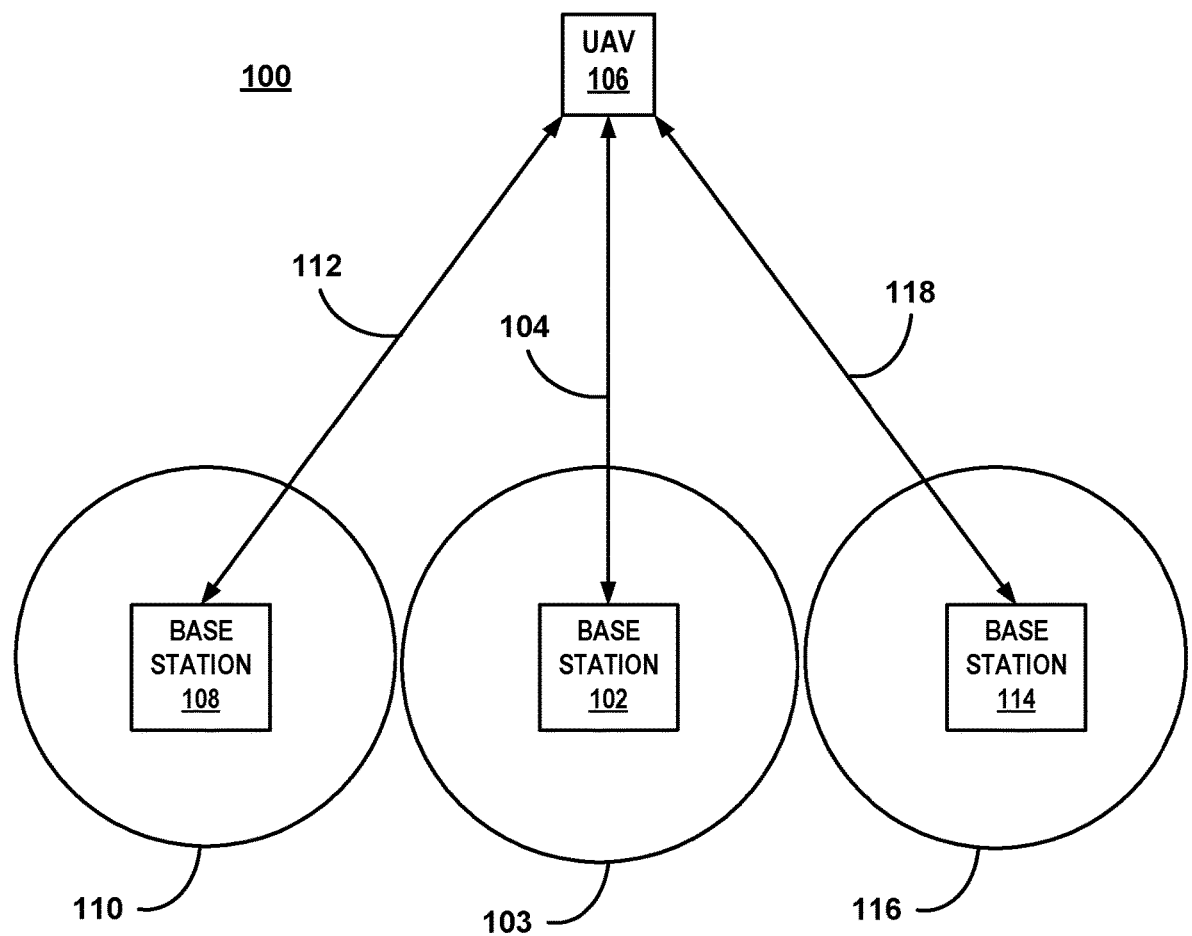
FIG. 1 is a block diagram of a system for an example in which an unmanned aerial vehicle (UAV) monitors downlink messages from a neighboring cell based on a calculated estimation of the uplink interference experienced at the neighboring cell based on a downlink signal received at the UAV from the neighboring cell.

There are a number of important considerations when connecting an unmanned aerial vehicle (UAV) to a network as a user equipment (UE) device. One example of a network to which the UAV can be connected is a 3rd Generation Partnership Project (3GPP) Long-Term Evolution (LTE) network. In other examples, the network is a fifth generation wireless system (5G) New Radio network. Regardless of the particular network to which the UAV connects, enhancements may be identified to better prepare the cellular networks for the data traffic growth from UAVs, such as drones, in the coming years.

When the UAV is flying well above a base station (eNB) antenna height, the uplink signal, which is transmitted from the UAV, may be received by multiple cells (e.g., base stations) due to line-of-sight propagation conditions. Thus, the likelihood of the uplink signal from the UAV causing interference to neighboring cells increases as the altitude of the UAV increases. In the scenarios in which the uplink signals from the UAV are considered to be interference to one or more neighboring cells, the interference gives a negative impact to the UE devices on the ground (e.g., smartphones, Internet of Things (IoT) devices, etc.).

To prevent such uplink interference, one or more cells that are not providing services to the UAV may vary their antenna beam patterns to steer away from the interfering UAV. In addition, the cell that is providing services to the UAV (e.g., serving cell or serving base station) may steer its antenna beam pattern towards the UAV. However, such antenna steering mechanisms are complicated and may impact services to terrestrial UE devices.

Due to uplink interference experienced by neighboring cells, it is important that the UAV's serving cell accounts for such interference during handovers. For example, the serving cell could handover the UAV to a neighboring cell that has the smallest uplink pathloss so that the UAV's transmit power may be minimized, which will also minimize uplink interference to neighboring cells. In other cases, the UAV's serving cell may try to allocate uplink resources not used by neighboring cells to avoid uplink interference.

However, in both cases, tight network coordination is needed, which may not be readily available today or in the foreseeable future. In some cases, network coordination may not even be possible due to the lack of backhaul link among cells (e.g., no X2 links), but without neighbor cell information, it is difficult for the serving cell to optimize the handover or allocate orthogonal resources to the UAV.

Based on the above observations, there is a need for UAVs to be informed of the neighbor cells' respective uplink interference conditions without tight network coordination. Some of the examples described herein include a method and a system in which a UAV can calculate, based on downlink signals received from the neighbor cells, an estimation of the uplink interference being experienced by the neighbor cells. Based on the estimated uplink interference levels, the UAV can monitor at least some of the downlink messages from one or more of the neighbor cells. When one of the monitored neighbor cells begins experiencing uplink interference that is not tolerable, that neighbor cell sends an uplink interference indicator to the UAV. Upon receipt of the uplink interference indicator, the UAV can take steps, with or without the serving cell, to mitigate the uplink interference experienced by the neighbor cell that transmitted the uplink interference indicator.

FIG. 1 is a block diagram of a communication system for an example in which an unmanned aerial vehicle (UAV) monitors downlink messages from a neighboring cell based on a calculated estimation of the uplink interference experienced at the neighboring cell based on a downlink signal received at the UAV from the neighboring cell. The communication system 100 is part of a radio access network (not shown) that provides various wireless services to UE devices that are located within the respective service areas of the various base stations that are part of the radio access network. Base station 102 is connected to the network through a backhaul (not shown) in accordance with known techniques. The base station 102 provides wireless services to UAV 106, which functions as a UE device in the examples herein. The base station 102 communicates with UAV 106 via communication link 104.

Although the UAV 106 is located above service area 103 of the base station 102 in FIG. 1, base station 102, in this example, is the serving base station for the UAV 106. For example, although the service areas 103, 110, 116 are shown as two-dimensional areas in FIG. 1, it is understood that for purposes of providing services to a UAV, the service areas actually extend upwards vertically to provide services to UAVs that may be located at various altitudes above the service areas shown in FIG. 1. Specifically, the determination of which base station is used to serve the UAV 106 in the Connected mode is controlled by the network according to multiple factors such as loading of the neighboring base stations, the base station antenna configurations, and the downlink signal strength measurement reports from the UAV 106. In this regard, it is worth noting that, similar to the coverage area that can be provided to traditional, terrestrial UE devices by a base station, the coverage area that can be provided to a UAV by a base station can also be affected by distance, environmental conditions, obstructions, and interference.

In the example shown in FIG. 1, communication link 104 is a Uu link between the UAV 106 and the base station (eNB) 102. Communication link 104 is configured to provide downlink communication from the base station 102 to the UAV 106 and to provide uplink communication from the UAV 106 to the base station 102.

In the interest of clarity and brevity, communication system 100 is shown as having only two neighboring base stations 108, 114, which provide wireless services to UE devices located within their respective service areas 110, 116. However, in other examples, communication system 100 could have any suitable number of base stations. In the example shown in FIG. 1, base station 102 is considered to be a serving base station since it is providing wireless services to UAV 106. However, neighboring base stations 108, 114 are also capable of providing wireless services to the UAV 106 via their respective communication links 112, 118, if the UAV 106 is handed over to one of the neighboring base stations 108, 114. Communication links 112, 118 are similar to communication link 104. If, for example, the UAV 106 is handed over to neighboring base station 108, then neighboring base station 108 would become the serving base station, and base station 102 would become a neighboring base station. For the purposes of the examples described herein, base stations are considered to be neighboring each other if they are relatively close to each other and/or the UAV 106 can simultaneously receive signals from each of the neighboring base stations at a given time.

Base station 102, which is sometimes referred to as an eNodeB or eNB, communicates with the UAV 106 by transmitting downlink signals via communication link 104. In the case of implementations that utilize the 5G New Radio air interface, the base station is sometimes referred to as a gNB. Base station 102 also receives uplink signals transmitted from the UAV 106 via communication link 104. As used herein, the terms "base station" and "cell" are interchangeable. In some cases, the serving cell is provided by a first base station, and the neighboring cell is provided by a second base station. However, in other cases, a serving cell and a neighboring cell may be provided by the same base station.

Although FIG. 2A specifically depicts the circuitry and configuration of serving base station 102, the same base station circuitry and configuration that is shown and described in connection with serving base station 102 is also utilized for neighboring base stations 108, 114 in the example shown in FIG. 1. In other examples, either of the base stations may have circuitry and/or a configuration that differs from that of the serving base station 102 shown in FIG. 2A.

Figure 2A:
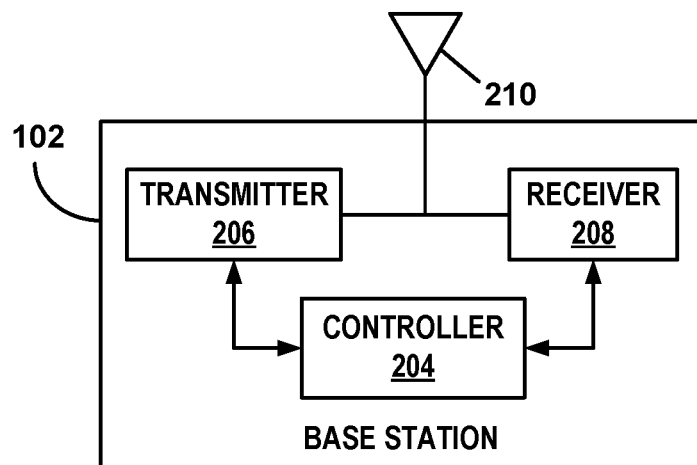
FIG. 2A is a block diagram of an example of the base stations shown in FIG.

As shown in FIG. 2A, base station 102 comprises controller 204, transmitter 206, and receiver 208, as well as other electronics, hardware, and code (not shown). The base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

The controller 204 includes any combination of hardware, software, and/or firmware for executing the functions described herein as well as facilitating the overall functionality of base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the downlink signals to be transmitted via communication link 104 and, in so doing, can apply any one of a plurality of modulation orders. The demodulator demodulates any uplink signals received at base station 102 in accordance with one of a plurality of modulation orders.

Returning to FIG. 1, the communication system 100 provides various wireless services to the UAV 106 via base station 102. For the example shown in FIG. 1, the communication system 100 operates in accordance with at least one revision of the 3rd Generation Partnership Project (3GPP) communication specification. In the example shown in FIG. 2B, the UAV 106 circuitry is configured to communicate directly with base station 102. For example, the UAV 106 receives downlink signals via communication link 104 using antenna 212 and receiver 214. The UAV 106 transmits uplink signals using transmitter 218 and antenna 212.

Besides antenna 212 and receiver 214, the UAV 106 further comprises controller 216 and transmitter 218, as well as other electronics, hardware, and code (not shown). The UAV 106 is any fixed, mobile, or portable equipment that performs the functions described herein. The various functions and operations of the blocks described with reference to the UAV 106 may be implemented in any number of devices, circuits, or elements. Two or more of the functional blocks may be integrated in a single device, and the functions described as performed in any single device may be implemented over several devices.

For the examples described herein, the UAV 106 is any wireless communication device that is capable of flight without having a human pilot aboard. In some examples, UAV 106 may be connected to an Evolved Universal Mobile Telecommunications System Terrestrial Radio Access Network (E-UTRAN) when flying and when on the ground. A drone would be one example of UAV 106. In the instances where the UAV 106 is a drone, the flight of the UAV 106 may operate with various degrees of autonomy, either under remote control by a human operator, autonomously by an onboard computer, or autonomously by a remote computer. In other cases, the UAV 106 may be a kite whose altitude can be manually adjusted by a human operator. In still other cases, the UAV 106 may be a kite whose altitude can be adjusted by an adjustable mechanized tether, which can be controlled by a human operator, by a programmed algorithm, or by the UAV 106 itself.

The controller 216 of the UAV 106 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters.

The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

Figure 2B:
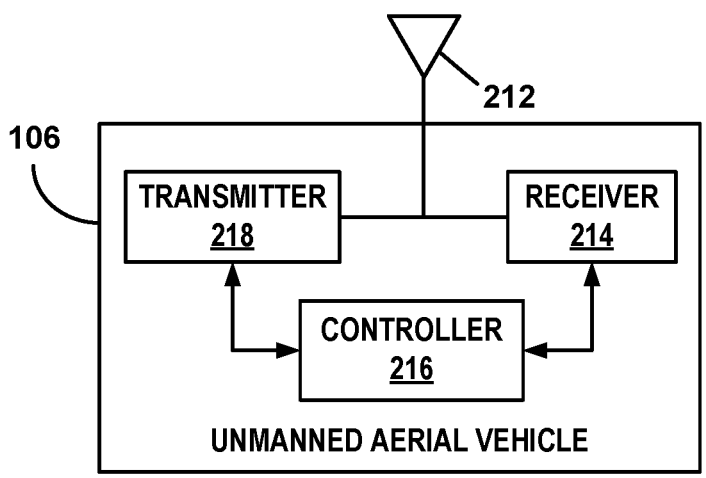
FIG. 2B is a block diagram of an example of the UAV shown in FIG. 1.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device (e.g., UAV 106).

The transmitter 218 includes a modulator (not shown), and the receiver 214 includes a demodulator (not shown). The modulator can apply any one of a plurality of modulation orders to modulate signals prior to transmission. The demodulator demodulates received signals in accordance with one of a plurality of modulation orders.

In operation, serving base station 102 provides wireless services to (e.g., serves) UAV 106 via communication link 104. However, due to the altitude at which the UAV 106 operates, the uplink transmissions from the UAV 106 may cause interference with one or more neighboring base stations 108, 114. More specifically, the uplink data transmissions from UAV 106 may interfere with the uplink data transmissions being transmitted by UE devices (not shown in FIG. 1) located within the respective service areas 110, 116 of the neighboring base stations 108, 114. As mentioned above, some of the examples described herein include a method and a system for informing the serving cell 102, via the UAV 106, of the neighbor cells' uplink interference condition to mitigate interference problems caused by the UAV 106. In other examples, the UAV 106 takes action to mitigate interference at the neighboring cells 108, 114 without involving the serving cell 102.

Figure 3:
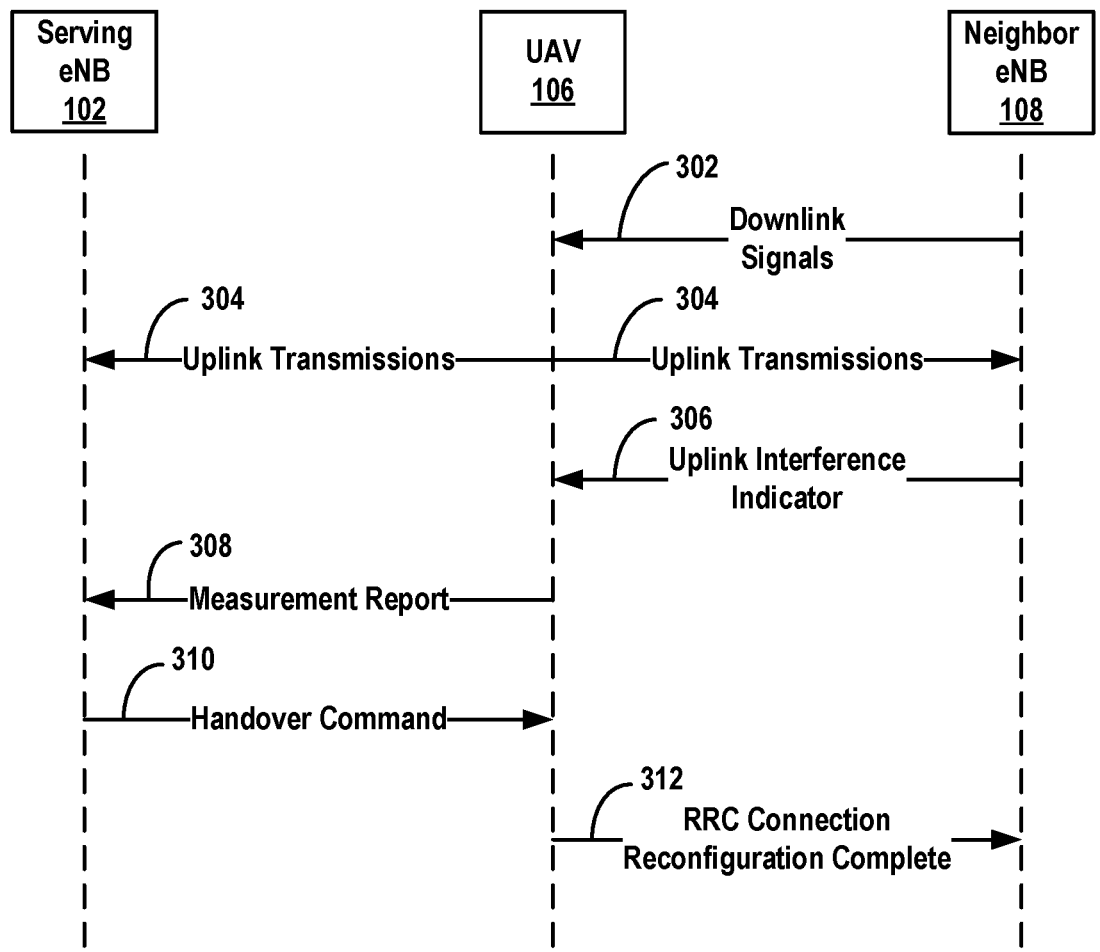
FIG. 3 is a messaging diagram of an example in which a UAV selects which downlink messages to monitor based on a calculated estimation of the uplink interference experienced at the neighboring cell based on a downlink signal received at the UAV from the neighboring cell.

FIG. 3 is a messaging diagram of an example in which a UAV selects which downlink messages to monitor based on a calculated estimation of the uplink interference experienced at a neighboring cell based on a downlink signal received at the UAV from the neighboring cell. In the interest of clarity and brevity, not all of the messages that are transmitted between the UAV 106 and the base stations 102, 108 are included in FIG. 3. Moreover, one or more of the messages that are shown in FIG. 3 may be omitted. Likewise, additional messages may be included beyond those shown in FIG. 3 that facilitate the mitigation of uplink interference experienced by the neighboring base station 108. Furthermore, the various signals shown in FIG. 3 may be combined with each other and/or substituted in any suitable manner that facilitates the mitigation of uplink interference experienced by the neighboring base station 108.

Besides showing an example in which the UAV 106 selects which downlink messages to monitor, FIG. 3 also shows the serving cell 102 making a handover decision for UAV 106 in order to mitigate the uplink interference being experienced by the neighboring base station 108. The handover decision for UAV 106 may have a profound impact on the severity of uplink interference due to the differences in the transmit power of the UAV 106 towards the selected target cell 108 for handover. In order for the serving cell 102 to make the proper handover decision, the serving cell 102 needs to know the extent of the uplink interference towards the neighboring cell(s) 108, 114. In some cases, the neighboring cell 108 that experiences the worst uplink interference may be the best target cell for handover. FIG. 3 depicts the messages that are exchanged between the UAV 106 and the base stations 102, 108 to make an informed handover decision.

In the example shown in FIG. 3, the UAV 106 receives, via its antenna 212 and receiver 214, at least one downlink signal from the neighboring base station 108. Although not explicitly shown in the example of FIG. 3, the UAV 106 may also receive at least one downlink signal from other neighboring base stations, including neighboring base station 114. The downlink signals are represented in FIG. 3 by signal 302.

Based on the one or more received downlink signals (e.g., from base station 108), the controller 216 of UAV 106 calculates an estimated uplink interference caused by the UAV 106 at the neighboring base station 108, based at least partially on at least one characteristic of the downlink signal 302 received at the UAV 106. In the example shown in FIG. 3, the at least one characteristic is the signal strength (e.g., Reference Signals Received Power (RSRP)) of the downlink signal 302. However, in other examples, other characteristics may be used instead of, or in addition to, signal strength.

The UAV 106 can be configured to calculate the estimated uplink interference for any neighboring base station 108, 114 from which the UAV 106 receives a downlink signal. Based on the estimated uplink interference levels, the UAV 106 configures its receiver 214 to monitor at least some downlink messages from one or more of the neighboring base stations 108, 114. In the example shown in FIG. 3, the at least some downlink messages to be monitored are System Information Block (SIB) messages. However, in other examples, other downlink messages may be monitored instead of, or in addition to, SIB messages.

When selecting which downlink messages to monitor, the UAV 106 could choose to read the SIB messages from only those neighboring base stations that have a downlink signal strength (e.g., Reference Signals Received Power (RSRP)) greater than a certain signal strength threshold measured at the UAV 106. This signal strength threshold could be defined by the network. In Frequency Division Duplex (FDD) deployments, the UAV 106 could assume that a neighboring base station 108 is receiving the uplink signal from the UAV 106 at a strength that is similar to the strength at which the UAV 106 is receiving the downlink signal from the same neighboring base station 108. In a Time Division Duplex (TDD) deployment, a simple downlink-uplink reciprocity is applied to determine the strength at which signals are being received between the UAV 106 and the neighboring base station 108.

In the example shown in FIG. 3, the UAV 106 transmits, via transmitter 218 and antenna 212, uplink transmissions that are intended for the serving cell (e.g., base station) 102. However, these uplink transmissions create unintended interference at neighboring cell (e.g., base station) 108. The base stations 102, 108 receive the uplink transmissions via their respective antennas 210 and receivers 208. The signal containing the uplink transmissions is represented in FIG. 3 by signal 304. In other examples, UAV 106 may transmit a Sounding Reference Signal (SRS) or a signal on the Physical Random Access Channel (PRACH) for uplink detection at the neighboring base station 108. The SRS and the PRACH signal can be configured by the serving cell 102.

Upon receipt of the uplink transmissions 304 from the UAV 106, the controller 204 of neighboring base station 108 determines whether the uplink transmissions 304 received from the UAV 106 are causing a level of interference at the neighboring cell 108 that exceeds an interference threshold. If the interference caused by the uplink transmissions 304 is below the interference threshold, the uplink interference caused by the uplink transmissions 304 from the UAV 106 is considered tolerable by the neighboring base station 108. However, if the interference caused by the uplink transmissions 304 exceeds the interference threshold, then the uplink interference caused by the uplink transmissions 304 from the UAV 106 is not tolerable by the neighboring base station 108.

If the uplink interference from the UAV 106 is not tolerable by the neighboring base station 108, the neighboring base station 108 will transmit, via its transmitter 206 and antenna 210, a message containing an uplink interference indicator to the UAV 106. However, in some cases, the neighboring base station 108 may still transmit an uplink interference indicator, even if the interference is tolerable, to inform the UAV 106 that the UAV 106 is causing uplink interference at the neighboring base station 108. The UAV 106 receives the message containing the uplink interference indicator with antenna 212 and receiver 214. The signal containing the uplink interference indicator is represented in FIG. 3 by signal 306.

As described above, the UAV 106 monitors/reads the SIB messages, and the neighboring base station 108 measures the uplink transmissions before transmitting the uplink interference indicator. Both of these tasks are performed in parallel and can be done as on-going background processes. However, in some cases, the neighboring cell 108 already has a heavy traffic load within its own cell, or the interference may be coming from other UAVs, and as a result, the Interference-over-Thermal (IoT) level has reached an intolerable level. In these cases, the neighboring cell 108 may not have to wait for the uplink transmissions from the UAV 106 and can simply transmit the uplink interference indicator via SIB messaging.

In the example shown in FIG. 3, the uplink interference indicator includes an identifier of the neighboring cell 108. For example, the identifier of the neighboring cell 108 may be a Physical Cell Identifier (PCI) associated with the neighboring cell 108. Of course, any suitable identifier could be included in the uplink interference indicator to identify the neighboring cell 108.

The message that contains the uplink interference indicator may also include an indication of whether the neighboring cell 108 is accepting UAV handovers since this may be useful information, in some cases. For example, if the uplink interference caused by the UAV 106 at the neighboring cell 108 is strong, the serving cell 102 may attempt to mitigate the uplink interference by handing UAV 106 over to the neighboring cell 108. However, if the neighboring cell 108 is already congested, the neighboring cell 108 may not be willing to accept the handover request from the serving cell 102. Thus, the serving cell 102 would not attempt to handover the UAV 106 to the neighboring cell 108 if the uplink interference indicator indicates that the neighboring cell 108 is not accepting UAV handovers.

In some examples, the uplink interference indicator includes a 1-bit indicator that indicates whether the neighboring cell 108 is accepting UAV handovers. For example, if the 1-bit indicator is set to a value of 0, the neighboring cell 108 is experiencing uplink interference above the interference threshold and is not accepting UAV handovers. If the 1-bit indicator is set to a value of 1, the neighboring cell 108 is experiencing uplink interference above the interference threshold and is accepting UAV handovers. Of course, any suitable indicator could be used to indicate whether the neighboring cell 108 is accepting UAV handovers.

In the example shown in FIG. 3, the neighboring cell 108 sends the uplink interference indicator using an SIB message. In other cases, the neighboring cell 108 transmits the uplink interference indicator to the UAV 106 over a Multicast-Broadcast Single Frequency Network (MBSFN) channel. However, any suitable downlink message could be used to transmit the uplink interference indicator to the UAV 106.

In some examples, the uplink interference indicator comprises a single threshold indicator comprising one bit. For example, if the neighboring cell 108 is configured to compare the uplink interference with a single interference threshold, the uplink interference indicator could be set to indicate whether the level of uplink interference being experienced by the neighboring cell 108 is above or below the interference threshold. In other examples, the uplink interference indicator also comprises a time window to facilitate determination of which UAV 106 caused the uplink interference at the neighboring cell 108. In still other examples, the uplink interference indicator also comprises a location of uplink radio resources where the uplink interference occurred.

In further examples, the uplink interference indicator comprises a multiple threshold indicator comprising one or more bits. For example, if the neighboring cell 108 is configured to compare the uplink interference with multiple interference thresholds, each of which is indicative of a different level of uplink interference being experienced by the neighboring cell 108, the uplink interference indicator could be set to reflect one of the multiple thresholds that is representative of the level of uplink interference being experienced by the neighboring cell 108. More specifically, a 1-bit uplink interference indicator could be used to represent 2 different interference thresholds, and a 2-bit uplink interference indicator could be used to represent 4 different interference thresholds.

Upon receipt of the uplink interference indicator, the controller 216 of the UAV 106 determines that the uplink interference indicator is addressed to the UAV 106 based on the timing of the uplink transmissions from the UAV 106 and the timing of the reception of the uplink interference indicator. However, in other examples, identifiers for any UAVs operating in the area may be shared among nearby cells so that the neighboring cell 108 can identify the interfering UAV 106. Thus, in these examples, the uplink interference indicator may also include an identifier associated with the interfering UAV 106.

Upon determining that the uplink interference indicator is addressed to the UAV 106, the UAV 106 takes action, alone or in conjunction with the serving cell 102, to mitigate the uplink interference being caused by the UAV 106. If acting alone, the UAV 106 may refrain, for a period of time, from transmitting uplink signals via the uplink radio resources that were utilized to transmit the uplink signals that caused the uplink interference at the neighboring cell 108. In some cases, the period of time is based on expiration of a timer. Alternatively, or in addition to refraining from transmitting, the UAV 106 may utilize a different subset of uplink radio resources that have been allocated to the UAV 106 for uplink transmissions. In still other examples, the UAV 106 may transmit its scheduling assignment information to the neighboring cell 108 so that the neighboring cell 108 can take steps to mitigate the interference (e.g., beam steering or rescheduling uplink transmissions from other UE devices and/or UAVs being served by neighboring cell 108).

If acting in conjunction with the serving cell 102, the UAV 106 informs the serving cell 102 of the uplink interference experienced by the neighboring cell 108. For the example shown in FIG. 3, the UAV 106 transmits, via transmitter 218 and antenna 212, a measurement report, including the neighboring cell identifier, which was received with the uplink interference indicator, to the serving cell 102 to inform the serving cell 102 of the uplink interference experienced by neighboring cell 108. The measurement report includes the uplink interference indicator received from the neighboring cell 108. In some cases, the measurement report may include multiple uplink interference indicators, each associated with a different neighboring cell 108, 114. In other examples, the UAV 106 transmits the measurement report separate from the uplink interference indicator and/or the neighboring cell identifier.

In the examples in which more than one neighboring cell 108, 114 is experiencing excessive uplink interference from the UAV 106, the UAV 106 may only inform the serving cell 102, via the measurement report, of the neighboring cell(s) 108 with the worst uplink interference, as reflected by the multiple threshold interference indicators discussed above. In other examples, the UAV 106 only informs the serving cell 102, via the measurement report, of the neighboring cell(s) 108 that are accepting UAV handovers, as reflected by the indication of whether the neighboring cell 108 is accepting UAV handovers discussed above. Of course, the UAV 106 may be configured to select which neighboring cells 108, 114 to identify in the measurement report based on any suitable criteria, including, for example, whether the neighboring cells 108, 114 can tolerate the uplink interference; the strength of the uplink interference being experienced by each of the neighboring cells 108, 114; whether the neighboring cells 108, 114 are accepting UAV handovers; and whether the UAV 106 will attempt to mitigate the uplink interference to one or more neighboring cells 108, 114 without involving the serving cell 102.

The serving cell 102 receives, via its antenna 210 and receiver 208, the measurement report transmitted by the UAV 106. The signal containing the measurement report is represented in FIG. 3 by signal 308. In some examples, the UAV 106 may inform the serving cell 102 of all or some of the neighboring cells 108, 114 that indicated that they were experiencing excessive uplink interference.

Upon receipt of the downlink measurement report, the controller 204 of the serving cell 102 determines whether UAV 106 should be handed over to neighboring cell 108 based on the contents of the uplink interference indicator (e.g., the neighboring cell identifier associated with the neighboring cell 108 that experienced the uplink interference) and the downlink measurement report associated with neighboring cell 108. In some examples, the serving cell 102 may also request an uplink measurement report from the neighboring cell 108 regarding the uplink signal strength associated with the UAV 106. The request for the uplink measurement report and the corresponding response are transmitted via a wired connection (not shown) between the serving cell 102 and the neighboring cell 108.

If the UAV 106 should be handed over, the serving cell 102 transmits, via its transmitter 206 and antenna 210, a handover command to inform the UAV 106 to handover to the neighboring cell 108. The UAV 106 receives the handover command with antenna 212 and receiver 214. The signal containing the handover command is represented in FIG. 3 by signal 310.

Upon receipt of the handover command, the UAV 106 complies with the handover command to perform a handover procedure to neighboring cell 108. In order to complete the handover procedure, the UAV 106 transmits, via transmitter 218 and antenna 212, a Radio Resource Control (RRC) Connection Reconfiguration Complete message to the neighboring cell 108. The neighboring cell 108 receives the RRC Connection Reconfiguration Complete message with its antenna 210 and receiver 208. The signal containing the RRC Connection Reconfiguration Complete message is represented in FIG. 3 by signal 312. Once the handover procedure is complete, the neighboring cell 108 becomes the serving cell for the UAV 106, and the serving cell 102 becomes a neighboring cell for the UAV 106.

Besides issuing a handover command to address the uplink interference being experienced by neighboring cell 108, the serving cell 102 may reconfigure a different uplink radio resource to the UAV 106 to mitigate the uplink interference, in other examples.

In some examples, upon receipt of the measurement report, which contains one or more uplink interference indicators, the serving cell 102 may choose to broadcast, via its transmitter 206 and antenna 210, one or more of the received uplink interference indicators in a System Information Block (SIB) message in the serving cell 102. By broadcasting the uplink interference indicator that pertains to a particular neighboring cell 108, other UAVs will not need to monitor the SIB messages from the neighboring cell 108 to find out if the neighboring cell 108 is broadcasting an uplink interference indicator. This SIB message from the serving cell 102 may also be used, in some examples, as an instruction to the UAV 106 not to perform downlink measurement of the indicated neighboring cell, which results in reduced power consumption and signaling overhead. The broadcasting of the uplink interference indicator of the neighboring cell 108 by the serving cell 102 efficiently informs nearby UAVs whether the neighboring cell 108 is broadcasting an uplink interference indicator.

In still other examples, the serving cell 102 may, upon receipt of the measurement report, also indicate in a dedicated signaling to the UAV 106 (e.g., as part of the handover command) whether an X2 or Xn interface is available for each of the neighboring cells 108, 114 that are experiencing uplink interference from the UAV 106. Alternatively, the serving cell 102 may also periodically broadcast SIB messages indicating whether an X2 or Xn interface is available for each of the neighboring cells 108, 114. The signal containing the indication whether an X2 or Xn interface is available for each of the neighboring cells 108, 114 is not explicitly shown in FIG. 3.

Although uplink transmissions from UAV 106 may cause interference to the neighboring cells 108, 114, the UAV 106 is also susceptible to downlink interference from transmissions by these neighboring cells 108, 114, which results in higher likelihood for radio link failures (RLF) or handover failures (HOF). In case of RLF or HOF, the UAV 106 will attempt to re-establish connection using the Connection Re-establishment procedure. However, the target cell that the UAV 106 chooses to re-establish connection with may not have the UAV's context information, which is essential for a successful re-establishment. This is different from the normal handover procedure (without HOF) whereby the serving cell 102 prepares the target cell by transferring the UAV's context information to the target cell prior to handover completion. In the RLF or HOF case, if the target cell does not have the UAV's context information, the target cell has the option to fetch the context information from the UAV's serving cell 102 during the re-establishment procedure, provided that an X2 or Xn link between the serving cell 102 and the target cell is available. If an X2 or Xn interface is not available, it will be necessary for the target cell to reject the UAV's Connection Re-establishment attempt, and the UAV 106 will need to transition to the IDLE mode and start a new connection, which may result in higher latency or even loss of packets.

If the serving cell 102 indicates in a SIB messaging broadcast which neighboring cells 108, 114 have an X2 or Xn interface to the UAV's serving cell 102, the UAV 106 may attempt to reselect and re-establish on one of the indicated neighboring cells 108, 114 as long as the selected cell is suitable (e.g., the downlink signal strength from the selected cell is sufficiently strong). If the UAV 106 reselects a neighboring cell with X2 or Xn connection to its serving cell 102 to re-establish connection, the probability of a successful Connection Re-establishment increases.

The availability of an X2 or Xn interface between the neighboring cells 108, 114 and the UAV's serving cell 102 is particularly important when the UAV may reselect a cell far away from its current serving cell 102, especially when the UAV 106 is flying above a certain altitude or if the UAV 106 experiences high interference from one or more neighboring cells 108, 114. Thus, in some examples, transmitter 206 of serving cell 102 is configured to transmit an altitude threshold value and/or an interference threshold value to the UAV 106. The UAV 106 receives the threshold values, via antenna 212 and receiver 214.

The UAV 106 utilizes controller 216 to determine the flight status of the UAV 106 based on (1) a comparison between the altitude threshold value and a measured altitude value of the UAV 106, and/or (2) a comparison between the interference threshold value and a measured interference value being experienced by the UAV 106 from one or more neighboring cells 108, 114. If the flight status of the UAV 106 indicates that the availability of an X2 or Xn interface between a potential target handover neighboring cell 108, 114 and the serving cell 102 is advisable in case of a radio link failure (RLF) or a handover failure (HOF), the UAV 106 will reselect a target neighboring cell that has an X2 or Xn interface to the UAV's current serving cell 102. In the event of an RLF or HOF, the UAV 106 will reselect the target neighboring cell as part of a re-establishment procedure.

In still other examples, the serving cell 102 maintains, in its memory, a mobility history for the neighboring cell 108. The mobility history indicates a statistical history of the following for the neighboring cell 108: uplink interference problems and/or UAV handover availability. The mobility history is based on one or more uplink interference indicators received from the UAVs that are operating in or near serving cell 102.

The mobility history can be used by the serving cell 102 to statistically predict which neighboring cells 108, 114 are likely to have uplink interference issues. The mobility history can also be used to update the uplink interference indicator information broadcast by the serving cell 102 via SIB messaging. Additionally, the mobility history may also be used by the serving cell 102 to configure the UAV 106 to monitor one or more specific neighboring cells 108, 114 that are more likely to broadcast an uplink interference indicator due to uplink interference.

Figure 4:
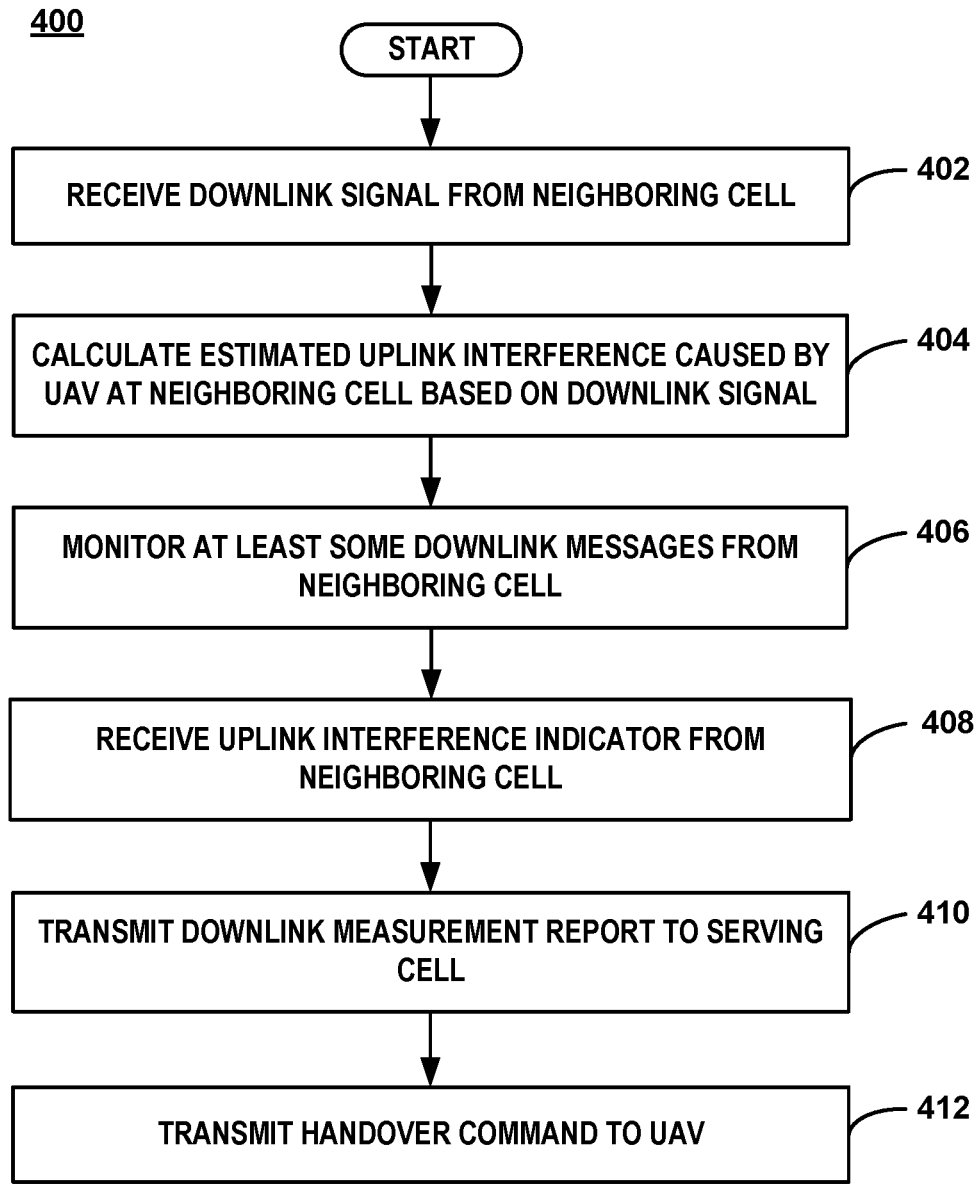
FIG. 4 is a flowchart of an example of a method in which a UAV selects which downlink messages to monitor based on a calculated estimation of the uplink interference experienced at the neighboring cell based on a downlink signal received at the UAV from the neighboring cell.

FIG. 4 is a flowchart of an example of a method in which a UAV selects which downlink messages to monitor based on a calculated estimation of the uplink interference experienced at the neighboring cell based on a downlink signal received at the UAV from the neighboring cell. The steps of method 400 may be performed in a different order than described herein and shown in the example of FIG. 4. Furthermore, in some examples, one or more of the steps may be omitted. Moreover, in other examples, one or more additional steps may be added. In some cases, multiple steps may be performed in parallel.

In the example shown in FIG. 4, the method 400 begins at step 402 with UAV 106 receiving a downlink signal from neighboring cell 108. The UAV 106 may also receive at least one downlink signal from other neighboring base stations, including neighboring base station 114. At step 404, the UAV 106 calculates an estimated uplink interference caused by the UAV 106 at the neighboring cell 108, based at least partially on at least one characteristic of the downlink signal received from the neighboring cell 108. The UAV 106 can estimate the uplink interference for any neighboring base station 108, 114 from which the UAV 106 receives a downlink signal.

In the example shown in FIG. 4, the calculation of the estimated uplink interference is based at least partially on the signal strength of the downlink signal. However, in other examples, other characteristics of the downlink signal may be used instead of, or in addition to, the signal strength of the downlink signal when estimating the uplink interference.

At step 406, based on the estimated uplink interference levels, the UAV 106 monitors at least some downlink messages from one or more of the neighboring base stations 108, 114. In the example shown in FIG. 4, the downlink messages that are to be monitored are System Information Block (SIB) messages. However, in other examples, other downlink messages may be monitored instead of, or in addition to, SIB messages.

The UAV 106 transmits uplink transmissions that are intended for the serving cell (e.g., base station) 102. However, these uplink transmissions may create unintended interference at neighboring cell (e.g., base station) 108. Upon receipt of the uplink transmissions from the UAV 106, the neighboring base station 108 determines whether the uplink transmissions received from the UAV 106 are causing a level of interference at the neighboring cell 108 that exceeds an interference threshold.

If the interference caused by the uplink transmissions is below the interference threshold, the uplink interference caused by the uplink transmissions from the UAV 106 is considered tolerable by the neighboring base station 108. However, if the interference caused by the uplink transmissions exceeds the interference threshold, then the uplink interference caused by the uplink transmissions from the UAV 106 is not tolerable by the neighboring base station 108. If the uplink interference from the UAV 106 is not tolerable by the neighboring base station 108, the neighboring base station 108 will transmit a message containing an uplink interference indicator to the UAV 106. However, in some cases, the neighboring base station 108 may still transmit an uplink interference indicator, even if the interference is tolerable, to inform the UAV 106 that the UAV 106 is causing uplink interference at the neighboring base station 108.

At step 408, the UAV 106 receives the message containing the uplink interference indicator from the neighboring cell 108. In the example shown in FIG. 4, the uplink interference indicator includes an identifier of the neighboring cell 108. For example, the identifier of the neighboring cell 108 may be a Physical Cell Identifier (PCI) associated with the neighboring cell 108. Of course, any suitable identifier could be included in the uplink interference indicator to identify the neighboring cell 108.

Upon receipt of an uplink interference indicator addressed to the UAV 106, the UAV 106 informs the serving cell 102 of the uplink interference experienced by the neighboring cell 108. For the example shown in FIG. 4, the UAV 106 transmits, at step 410, a measurement report, including the neighboring cell identifier, which was received with the uplink interference indicator, to the serving cell 102 to inform the serving cell 102 of the uplink interference experienced by neighboring cell 108. The measurement report includes the uplink interference indicator received from the neighboring cell 108. In some cases, the measurement report may include multiple uplink interference indicators, each associated with a different neighboring cell 108, 114. In other examples, the UAV 106 transmits the measurement report separate from the uplink interference indicator and/or the neighboring cell identifier.

Upon receipt of the downlink measurement report, the serving cell 102 may, in some examples, transmit dedicated signaling to the UAV 106 (e.g., as part of the handover command) whether an X2 or Xn interface is available for each of the neighboring cells 108, 114 that are experiencing uplink interference from the UAV 106.

The serving cell 102 also determines whether UAV 106 should be handed over to neighboring cell 108 based on the contents of the uplink interference indicator (e.g., the neighboring cell identifier associated with the neighboring cell 108 that experienced the uplink interference) and the downlink measurement report associated with neighboring cell 108. If the UAV 106 should be handed over, the serving cell 102 transmits, at step 412, a handover command to inform the UAV 106 to handover to the neighboring cell 108. Upon receipt of the handover command, the UAV 106 complies with the handover command to perform a handover procedure to neighboring cell 108. Once the handover procedure is complete, the neighboring cell 108 becomes the serving cell for the UAV 106, and the serving cell 102 becomes a neighboring cell for the UAV 106.

Besides issuing a handover command to address the uplink interference being experienced by neighboring cell 108, the serving cell 102 may reconfigure a different uplink radio resource to the UAV 106 to mitigate the uplink interference, in other examples.

As described above, in some examples, upon receipt of the measurement report, which contains one or more uplink interference indicators, the serving cell 102 may choose to broadcast one or more of the received uplink interference indicators in a System Information Block (SIB) message in the serving cell 102. In other examples, the serving cell 102 may also indicate in a SIB messaging broadcast whether an X2 interface is available for each of the neighboring cells 108, 114 that are experiencing uplink interference from the UAV 106.

In still other examples, the serving cell 102 maintains a mobility history for the neighboring cell 108. The mobility history indicates a statistical history of the following for the neighboring cell 108: uplink interference problems and/or UAV handover availability. The mobility history is based on one or more uplink interference indicators received from the UAVs that are operating in or near serving cell 102. The mobility history can be used by the serving cell 102 to statistically predict which neighboring cells 108, 114 are likely to have uplink interference issues. The mobility history can also be used to update the uplink interference indicator information broadcast by the serving cell 102 via SIB messaging. Additionally, the mobility history may also be used by the serving cell 102 to configure the UAV 106 to monitor one or more specific neighboring cells 108, 114 that are more likely to broadcast an uplink interference indicator due to uplink interference.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, at an unmanned aerial vehicle (UAV), a downlink signal from a neighboring cell;
   calculating an estimated uplink interference caused by the UAV at the neighboring cell based at least partially on at least one characteristic of the downlink signal;
   based on the estimated uplink interference, monitoring, by the UAV, at least some downlink messages from the neighboring cell; and
   receiving a message containing an uplink interference indicator from the neighboring cell, the uplink interference indicator including an identifier of the neighboring cell.

2. The method of claim 1, wherein the at least one characteristic of the downlink signal comprises a signal strength of the downlink signal.

3. The method of claim 1, wherein monitoring at least some downlink messages from the neighboring cell comprises:
   monitoring System Information Block (SIB) messages from the neighboring cell.

4. The method of claim 1, wherein the message containing the uplink interference indicator comprises an indication of whether the neighboring cell is accepting UAV handovers.

5. The method of claim 1, wherein the uplink interference indicator comprises a multiple threshold indicator comprising one or more bits.

6. The method of claim 1, wherein the identifier of the neighboring cell comprises a Physical Cell Identifier (PCI) associated with the neighboring cell.

7. The method of claim 1, further comprising:
   transmitting a measurement report to a serving cell, the measurement report including the uplink interference indicator received from the neighboring cell.

8. A system comprising:
   a neighboring cell comprising a transmitter configured to transmit a downlink signal; and
   an unmanned aerial vehicle (UAV) comprising a receiver and a controller, the receiver configured to receive the downlink signal,
      the controller configured to calculate an estimated uplink interference caused by the UAV at the neighboring cell based at least partially on at least one characteristic of the downlink signal,
      the receiver further configured to monitor at least some downlink messages from the neighboring cell, based on the estimated uplink interference,
      the receiver further configured to receive a message containing an uplink interference indicator from the neighboring cell, the uplink interference indicator including an identifier of the neighboring cell.

9. The system of claim 8, wherein the at least one characteristic of the downlink signal comprises a signal strength of the downlink signal.

10. The system of claim 8, wherein the at least some downlink messages from the neighboring cell comprise System Information Block (SIB) messages from the neighboring cell.

11. The system of claim 8, wherein the message containing the uplink interference indicator comprises an indication of whether the neighboring cell is accepting UAV handovers.

12. The system of claim 8, wherein the uplink interference indicator comprises a multiple threshold indicator comprising one or more bits.

13. The system of claim 8, wherein the identifier of the neighboring cell comprises a Physical Cell Identifier (PCI) associated with the neighboring cell.

14. The system of claim 8, wherein the UAV further comprises:
   a transmitter configured to transmit a measurement report to a serving cell, the measurement report including the uplink interference indicator received from the neighboring cell.

15. The system of claim 14, wherein the serving cell comprises:
   a transmitter configured to transmit the uplink interference indicator in a System Information Block (SIB) message.

16. The system of claim 14, wherein the serving cell comprises:
   a transmitter configured to transmit an indicator of whether an X2 or Xn interface is available for at least one neighboring cell.

17. The system of claim 14, wherein the serving cell comprises:
   a transmitter configured to transmit a handover command to the UAV based at least partially on the measurement report.

18. The system of claim 14, wherein the serving cell comprises:
   a memory configured to maintain a mobility history for the neighboring cell, wherein the mobility history indicates a history of at least one of the following for the neighboring cell: uplink interference problems and UAV handover availability.

19. The system of claim 18, wherein the serving cell further comprises:
   a controller configured to predict whether the neighboring cell is likely to have uplink interference problems based on the mobility history for the neighboring cell.

20. The system of claim 19, wherein the serving cell further comprises:
a transmitter configured to transmit a System Information Block (SIB) message that identifies the neighboring cell as a cell that is likely to transmit an uplink interference indicator.

21. The system of claim 18, wherein the serving cell further comprises:
a transmitter configured to transmit configuration information to the UAV to configure the UAV to monitor at least some downlink messages from the neighboring cell based on the mobility history for the neighboring cell.

22. An unmanned aerial vehicle (UAV) comprising:
a receiver configured to receive a downlink signal transmitted from a neighboring cell; and
a controller configured to calculate an estimated uplink interference caused by the UAV at the neighboring cell based at least partially on at least one characteristic of the downlink signal,
the receiver further configured to monitor at least some downlink messages from the neighboring cell, based on the estimated uplink interference,
the receiver further configured to receive a message containing an uplink interference indicator from the neighboring cell, the uplink interference indicator including an identifier of the neighboring cell.

23. The UAV of claim 22, wherein the at least one characteristic of the downlink signal comprises a signal strength of the downlink signal.

24. The UAV of claim 22, wherein the at least some downlink messages from the neighboring cell comprise System Information Block (SIB) messages from the neighboring cell.

25. The UAV of claim 22, wherein the message containing the uplink interference indicator comprises an indication of whether the neighboring cell is accepting UAV handovers.

26. The UAV of claim 22, wherein the uplink interference indicator comprises a multiple threshold indicator comprising one or more bits.

27. The UAV of claim 22, wherein the identifier of the neighboring cell comprises a Physical Cell Identifier (PCI) associated with the neighboring cell.

28. The UAV of claim 22, wherein the UAV further comprises:
a transmitter configured to transmit a measurement report to a serving cell, the measurement report including the uplink interference indicator received from the neighboring cell.

* * * * *